Patented Apr. 14, 1925.

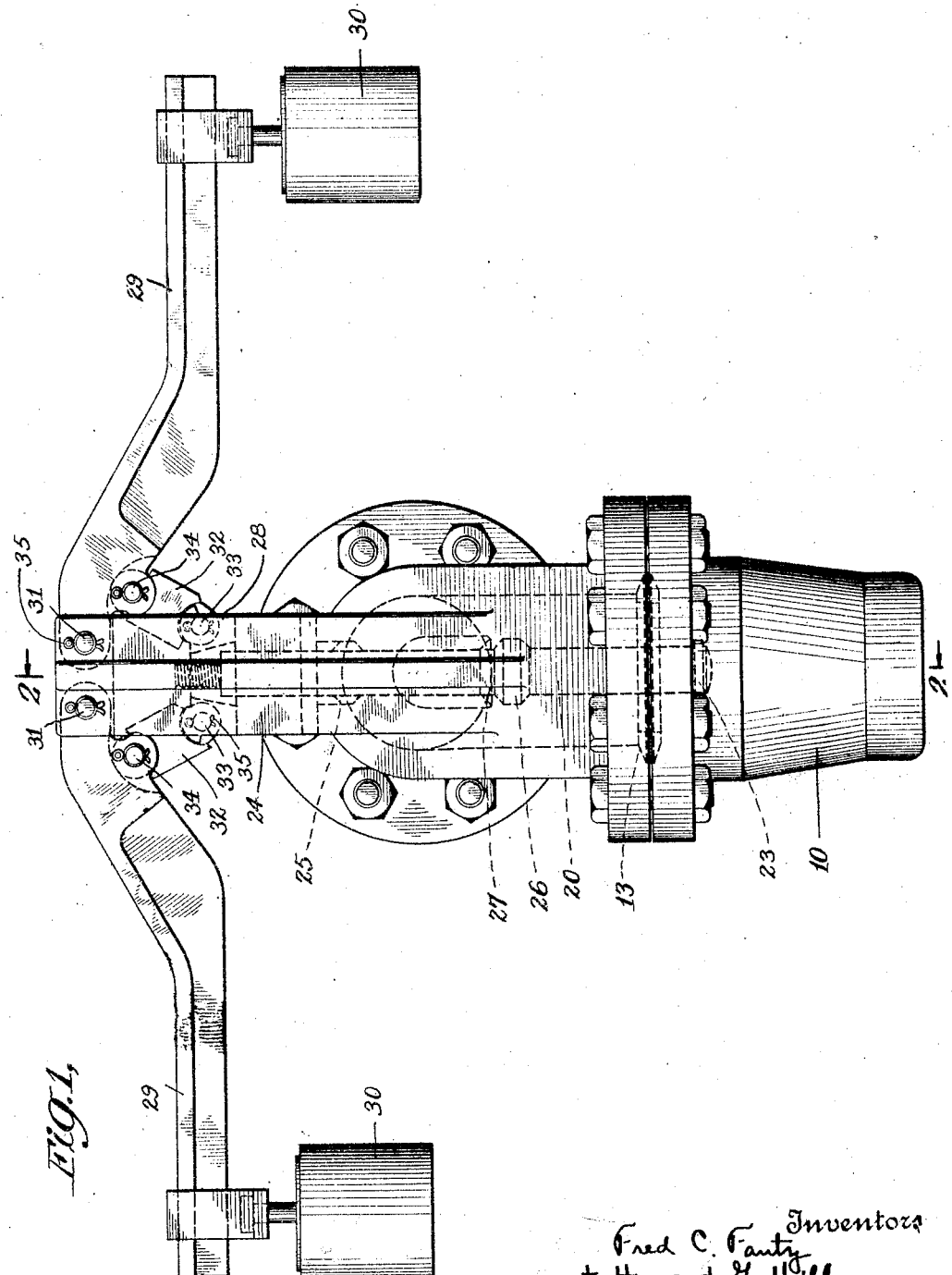

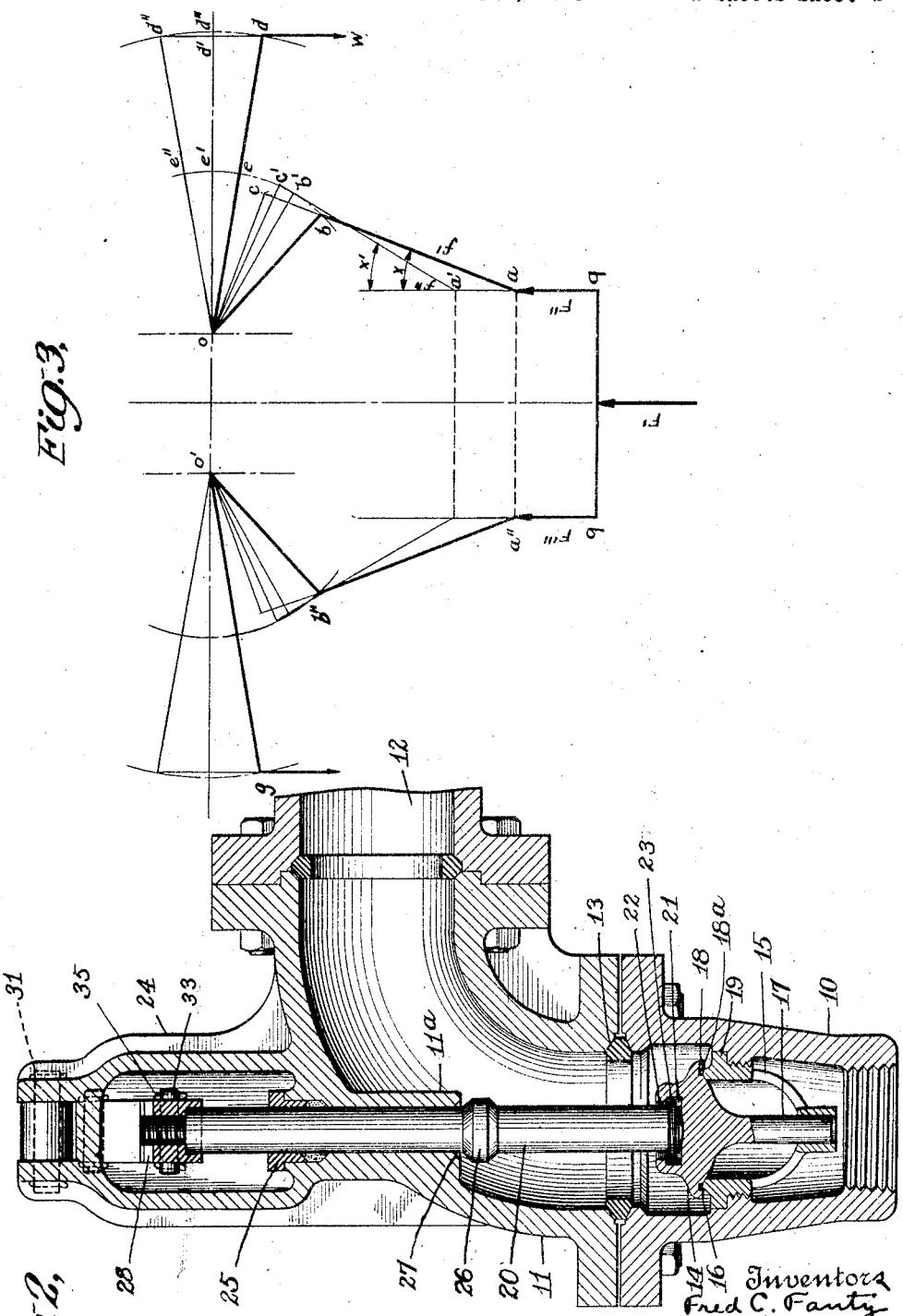

1,533,640

UNITED STATES PATENT OFFICE.

FRED C. FANTZ AND HOWARD G. HILL, OF PORT ARTHUR, TEXAS, ASSIGNORS TO THE TEXAS COMPANY, OF NEW YORK, N. Y., A CORPORATION OF TEXAS.

RELIEF VALVE.

Application filed May 4, 1921. Serial No. 466,858.

*To all whom it may concern:*

Be it known that we, FRED C. FANTZ and HOWARD G. HILL, citizens of the United States, residing in Port Arthur, Jefferson County, and State of Texas, have invented certain new and useful Improvements in Relief Valves, of which the following is a specification.

This invention relates to high pressure relief valves and has particular reference to valve mechanism for relieving the pressure of inflammable or explosive fluids in such manner that while excessive pressure may be reduced, the fluids may be retained within limits.

One object of the invention is to provide a valve capable of opening and closing with an accelerated motion in order to prevent wire-drawing.

Another object is to provide a valve capable of functioning properly under high pressures and adapted to discharge rapidly fluids under high temperatures.

Additional objects and advantages of the invention will be set forth in the following detailed description thereof.

In the accompanying drawings we have illustrated a preferred form of the invention in which:—

Figure 1 is an elevation of an apparatus constructed in accordance with the invention and constituting an embodiment thereof.

Figure 2 is a vertical section taken on the line 2—2 of Figure 1.

Figure 3 is a diagram given by way of example to illustrate certain principles of the invention.

In the drawings 10 designates a valve body and 11 a valve bonnet. The body is arranged to be mounted in a vertical position and to form with the bonnet an L fitting in order that fluids escaping when the valve is opened may be discharged into a pipe 12 by which the fluids may be safely removed. A packing ring 13 may be provided in order to insure a gas tight joint between the body and the bonnet.

A valve 14 is mounted within the body 10 and a seat and a guide for the valve are provided by means of a cage 15, the upper annular portion of which constitutes a valve seat 16 and the depending wings of which form a guide for the lower part 17 of the valve so that the valve may be centered upon its seat. For the purpose of providing the required buoyancy the valve is preferably equipped with a projecting lip 18 extending around its periphery and with an intervening annular cavity 18ᵃ. The cage is equipped with threads by means of which it may be attached to the body 10, a shoulder 19 being adapted to fit into a recess in the body and thus form a tight joint.

The valve 14 is provided with a stem 20 which is arranged to be placed in operative engagement with the valve in such a manner as will insure a flexible action between valve and stem. As shown in the drawing the upper end of the valve is hollowed out to form a cavity 21 communicating with which is a threaded opening 22. The lower end of the valve stem has a flange portion 23 externally threaded to engage the threads 22. In joining the parts the valve stem is screwed into the valve until the ring or flange portion is within the hollow cavity 21 which has a somewhat larger diameter than the threaded opening 22, thus giving the valve stem a free movement with reference to the valve.

A yoke 24 is suitably mounted upon the bonnet 11 and the valve stem 20 is arranged to pass through the wall of the bonnet and extend upwardly within this yoke. A boss 11ᵃ is preferably provided to serve as a guide for the valve stem. The valve stem is equipped with a stuffing box 25.

The stem is made with an enlargement forming a shoulder 26 which, upon the upward movement of the stem, is adapted to be seated in a recess 27 located in the boss 11ᵃ. The shoulder is adapted to form a tight joint when seated in the recess 27 and thus serves not only to limit the upward movement of the valve but to protect the stuffing box 25 from the pressure exerted in the bonnet 11 when the valve 14 is open. This feature is especially desirable when using the valve to relieve the pressure of highly heated vapors and gases as the packing is shielded from the deteriorating action of the hot gases.

The valve stem is provided with a crosshead 28 to which it may be attached in any suitable manner. A pair of arms 29 carrying adjustable weights 30 are fulcrumed on pins 31 which are supported in holes in the upper end of the yoke 24.

The valve stem crosshead is attached to the weighted arms by means of toggle links 32, the crosshead being secured to one end of each link by means of pins 33 and the toggle links being fastened to the arms by means of pins 34. The fulcrum pins 31 and the pins 33 and 34 may be secured with cotter pins 35.

Referring now to Figure 3 an explanation of the various forces acting through the toggle joints, as well as their points of application to the various links and levers will be given in order that the principle of operation of these elements be clearly understood.

In Figure 3, F′ represents the force of the pressure under the valve acting vertically upward through the valve stem 20; the crosshead 28 is represented by the line qq′ at right angles to the line of force F′; F″ and F‴ denote the forces acting on each pin 33, respectively, the direction of these forces being parallel to the force F′ and the magnitude of each of which is equal to ½ F′; a and a″ denote the crosshead pins 33; b and b″ represent the weighted arm pins 34; o and o′ designate the fulcrum pins 31, and d and g denote the points of application of the weights 30 to the arms 29, which are indicated by lines o d and o′ g respectively.

In order to simplify the explanation the action of forces operating against only one of the weighted levers 29 is considered and to render the description concrete it is assumed that the valve is designed to hold pressures up to 250 pounds per square inch within the vessel to which it is connected. The diameter of the opening covered by the valve when seated is taken as 3 inches and, therefore, the area is 7.069 square inches. A pressure of 250 pounds per square inch on the lower surface of the valve gives approximately a total force of 1770 pounds acting in an upward direction parallel to the valve stem. This force is divided at the crosshead 28 and is transmitted to each of the links 32 as a force of 885 pounds, F″ and F‴, acting in a direction parallel to the force F′. It is to be understood that in the calculations given herein no account is taken of friction.

When the valve is closed a line drawn through points a and b forms the angle x with the line qa′. By computation this angle is found to be 20° 11′ 46″. Since the force F″ acting on the line qa is 885 pounds the resulting force f′ directed along the line ab is calculated to be 944 pounds. By projecting the line ab to the point c and erecting a perpendicular oc to the line at the point c which will pass through the point o, the turning moment of the force f′ about the center o can be calculated. The line oc is 1.8125 inches in length. The turning moment equals the force acting on line ac multiplied by the distance oc, that is, 994 × 1.8125 = 1,711 inch pounds.

In order to determine the weight W required at the point d to balance a turning moment of 1.711 inch pounds at the point o, the length of od is assumed to be 15 inches and, using the formula $$W = \frac{f' \times oc}{od},$$

it is found that W=114 pounds, or in other words that with a weight of 114 pounds on the arm 29, positioned 15 inches horizontally from point o, a pressure of 250 pounds per square inch would be maintained under the valve. It is to be noted that the line abc is not at right angles to the line od; however, if the force f′ (944 pounds) were applied at right angles to the lever od at a distance from the point o equal to oc the same weight would be required to balance the force. The weight W acts in a direction parallel and opposite to the force F′, and, therefore, perpendicular to the line oe′d′d‴.

When the pressure under the valve rises above 250 pounds the opposing force of the weight W is overcome and the point a moves along the line qa′ until it reaches the point a′ which is the limit of its travel. During the movement of the point a, the point b travels along the arc be″ being restricted to that path by the fact that the length of the line ob remains constant, and ob equals o′b′. Point b now occupies position b′ and the original angle x between the lines qa′ and ab has been increased to angle x′ between the lines qa′ and a′b′. The magnitude of the angle x′ is calculated to be 30° and as it is thus greater than the angle x, the force f″ acting on the line a′b′ is greater than the force f′ acting on the line ab. The force F″ remains 885 pounds, but the force f″ acting on the line a′b′ is found to be 1022 pounds. The perpendicular c′o′ erected on the line a′b′ is the length of the moment arm of the force f″ acting about the point o. It is found to be 2 inches in length. Therefore, the turning moment of the force f″ about the point o is equal to f″ × oc′ or 2044 inch pounds. It is obvious that the force now acting on the lever 29 is greater than that acting on it when the valve was closed. It would, therefore, require a heavier weight or removal of the weight a greater distance from the center o to balance the force acting under the valve when open. In this case it is found that the weight of 114 pounds must be placed 18 inches from the center o in order to balance the force acting on the valve. We thus have a condition in which the movement of the levers during the opening of the valve has increased the force of the upward thrust of the valve stem in its relation to the force applied to the weight arm by the weight W, although the pressure acting on the underside of the valve may be regarded as decreasing while the valve remains open. The quick action of the valve is due partly to this increase of the upward force acting against the weighted arms.

In order to clearly illustrate the principles involved it is necessary to consider the manner in which the length of the line $oc$ (which represents the moment arm when the valve is closed) is increased to the length $oc'$ when the valve is open. The increase is due to the fact that the point $b$ moves on the arc $be''$ about the point $o$ on a line which does not pass through the center $o$. The relative lengths of the lines $ab$, $ob$ and the position of the center $o$ in respect to the line $qa'$ are such as to increase the speed at which the mechanism operates after it has once started from a state of rest. By noting the position of points $d$, $d'''$ and $d''$ it will be seen that the center of gravity of the weight W does not move through a straight line, as through $dd'$ $d''$, but instead moves along the arc $dd'''$ $d''$. As the distance $od'''$ is greater than $od'$, it is obvious that the moment arm and, therefore, the turning moment of the weight W about the point $o$ is greatest when the point $d'''$ is reached and that when $d''$ is reached the length of the moment arm is again equal to $od'$. The difference in length, however, of the moment arms $od'$ and $od'''$ is so small as to require a decrease of only 1.6 pounds in the weight W at $d'''$ to equal the original turning moment at the point $d$. As this difference is relatively small it may be disregarded and the weight considered as moving along the straight line $dd'$ $d''$, its turning moment being, therefore, considered as constant. Thus the only appreciable variation in magnitude of the forces acting on the lever are caused by the change in the length of the moment arm from $oc$ to $oc'$ and the increase from force $f'$ to $f''$. The increase in the force exerted against the weight W takes place at a definite rate with the opening of the valve and is such that the ratio of the force $f''$ to weight W is greater than that of force $f'$ to weight W.

When the weight is in its uppermost position it is found that the force $f''$ exerted along the line $a'b'$, when angle $x'$ is 30°, amounts to 855 pounds. The opposing force F'' acting along the line $qa'$ is found to be 740 pounds. This force of 740 pounds is required to balance the weight W in its uppermost position, and is less than the original force, F'' (885 pounds), necessary to open the valve, due to the fact that the moment arm $oc'$ for the upper position is longer than $oc$ and therefore requires a lower force to produce the same turning moment about the point $o$.

$$\frac{2 \times 740}{7.069} = 210$$

pounds per square inch (approximately), which is the pressure under the valve which will keep it open when the weighted arms are in the uppermost position. When the pressure drops below this point the turning moments of the weights about the points $o$ and $o'$ overbalance the turning moments of the forces acting through the crosshead and links, and the weights drop moving the valve toward a closed position. In the downward movement the length of the arm $oc'$ is being decreased to its original length $oc$ and the point $b'$ moves along the arc $be''$ and assumes its original position $b$. The angle $x'$ is also reduced by the same movement to angle $x$, decreasing the force $f''$ to $f'$. Since the force of the weight remains practically constant and as its magnitude in relation to the force $f''$ increases until it is only acting against the force $f'$ there is a tendency to accelerate the closing movement of the valve.

In operation when the predetermined pressure, for which the valve is set, is reached the valve will be moved off its seat and if it is constructed with the projecting lip 18 and cavity 18ª, by which the effective area acted on by the pressure of the contained fluids is increased, there is a tendency to accelerate the upward movement of the valve. This movement is further accelerated by the lever arrangement by which, as the valve moves upward, the force acting upon the weighted arms 29 is progressively increased. The result is that the valve pops off its seat and reaches the upper extremity of its travel in one quick movement. When the pressure has been reduced a predetermined amount the weighted arms force the valve downward and by reason of the relative progressively increasing force exerted by the weighted arms the valve is forced into close contact with its seat sealing the opening and thereby preventing wire-drawing at the critical point in the cycle of operation of the valve.

The valve of our invention is particularly adapted as a safety valve on stills wherein hydrocarbon oils are distilled under pressure inasmuch as the quick opening and closing of the valve prevents deposition of carbon between the valve and its seat and effectually eliminates wire-drawing.

Apparatus of preferred form and construction has been illustrated and described for the purpose of showing a way in which this invention may be used, but the inventive thought upon which the application is based, is broader than this illustrative embodiment thereof, and we therefore intend no limitations other than those imposed by the appended claims.

What we claim is:

1. In a relief valve, a casing having inlet and outlet ports, a valve seated between said ports, a valve stem and means including a plurality of fulcrumed lever arms carrying adjustable weights in operative connection with the stem for holding the valve on its seat against a predetermined pressure and for imparting to the valve an accelerated movement during its opening and closing.

2. In a relief valve, a casing having inlet and outlet ports, a valve seated between said ports, a valve stem extending outside the casing, a crosshead secured to said stem, toggle links pivotally joined to the crosshead and weighted arms in operative connection with said toggle links in such manner that movement of the valve in opening and closing is accelerated.

3. In a relief valve, a casing having inlet and outlet ports, a valve seated between said ports, a yoke mounted upon the casing, a valve stem protruding outside said casing and extending within said yoke, a crosshead secured to the exterior portion of said stem, toggle links pivotally attached to the crosshead, and weighted arms fulcrumed on the yoke and pivotally attached to said links.

4. In a relief valve, a casing having inlet and outlet ports, a valve seated between said ports, a yoke mounted upon the casing, a valve stem extending within said yoke, a crosshead rigidly secured to the valve stem, a toggle link pivotally joined to each end of the croshead, a weighted arm pivotally attached to each toggle link and fulcrumed within the yoke.

5. In a relief valve, a casing having inlet and outlet ports, a valve seated between said ports, a yoke mounted upon the casing, a valve stem extending within said yoke, a crosshead rigidly secured to the valve stem, and a plurality of weighted arms in operative connection with the crosshead by means of toggle links in such manner that the upward and downward movement of the valve stem is accelerated.

6. In a relief valve, a casing having inlet and outlet ports, a valve seated between said ports, a yoke mounted upon the casing, a valve stem flexibly joined to the valve and extending within said yoke, a crosshead rigidly secured to the valve stem, and a plurality of weighted arms in operative connection with said crosshead by means of toggle links in such manner that the opening and closing of the valve is accelerated.

7. A relief valve comprising a chambered casing having a valve seat therein, a movable valve normally resting upon said seat, a yoke mounted upon the casing, a valve-stem connected to and extending above the valve and within the yoke, and means mechanically connected to said valve stem and said yoke constructed and arranged to cause the valve to open with an accelerated movement under predetermined conditions of pressure acting thereon, said means being adapted to cause the valve to close with an accelerated movement when the pressure has dropped to a predetermined amount.

8. A relief valve comprising a chambered casing having a valve seat therein, a movable valve normally resting upon said seat, and a weighted toggle mechanism connected to said valve and constructed and arranged to cause the valve to open with an accelerated movement under predetermined pressure conditions.

9. A relief valve comprising a chambered casing having a valve seat therein, a movable valve normally resting upon said seat and a plurality of weighted toggle mechanisms connected to said valve and acting concurrently thereon to cause the valve to open and to close with an accelerated movement under different predetermined pressure conditions.

10. In an automatic relief valve, a casing having an inlet and an outlet port, a valve seated between said ports and provided with a valve stem, and means including weighted lever arms and fulcrumed toggle links for accelerating the opening of the valve at a predetermined pressure and for maintaining the valve in open position until a substantially lower and predetermined pressure has been reached.

In witness whereof we have hereunto set our hands and seals this 23d day of April 1921.

FRED C. FANTZ,
HOWARD G. HILL.